Aug. 4, 1925. 1,548,706
L. H. BROOME
GLASS PANE COUPLING DEVICE
Filed June 28, 1924 2 Sheets-Sheet 2
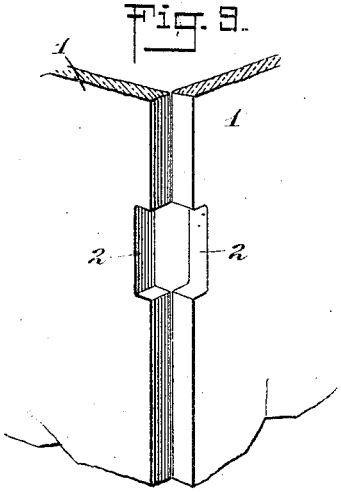
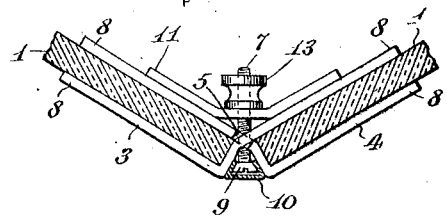
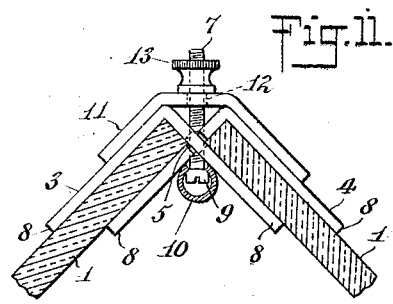
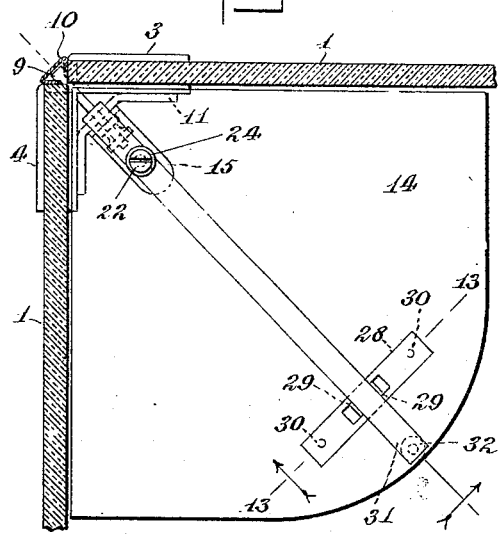
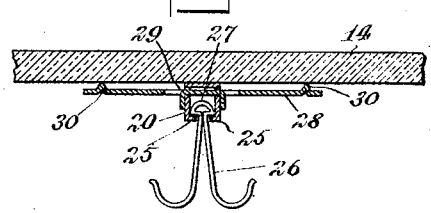
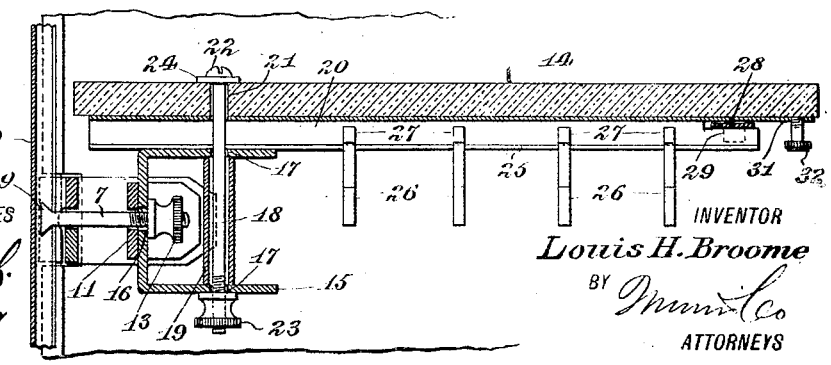
WITNESSES
INVENTOR
Louis H. Broome
BY
ATTORNEYS Patented Aug. 4, 1925.

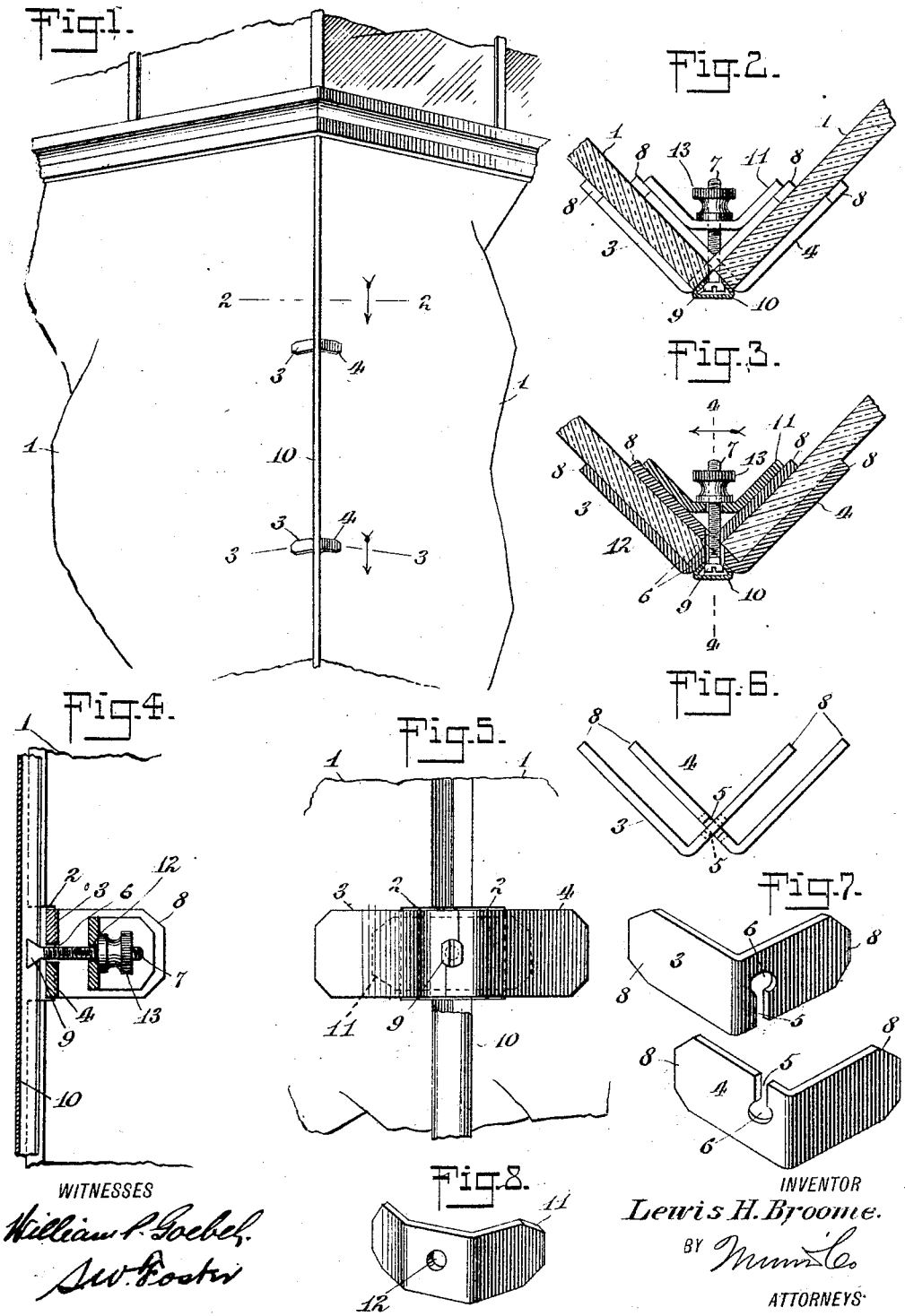

1,548,706

UNITED STATES PATENT OFFICE.

LEWIS H. BROOME, OF JERSEY CITY, NEW JERSEY.

GLASS-PANE-COUPLING DEVICE.

Application filed June 28, 1924. Serial No. 723,024.

*To all whom it may concern:*

Be it known that I, LEWIS H. BROOME, a citizen of the United States, and a resident of Jersey City, in the county of Hudson and State of New Jersey, have invented new and useful Improvements in Glass-Pane-Coupling Devices, of which the following is a full, clear, and exact description.

This invention relates to glass pane coupling devices and more particularly to an improved construction and arrangement of clip with co-operating means for securing two panes at an angle to each other, an object of the invention being to provide securing means which not only result in an economy in the cost of assemblage but insures a perfectly tight, secure coupling between the panes, holding the latter at the desired angle and capable of adjustment in accordance with the thickness of the panes.

A further object is to provide an improved construction of clip embodying two members identical in form so that they may be stamped or otherwise shaped in a single die or mold and which when properly coupled provide gripping means for both faces of both panes of glass which they function to couple.

My invention is particularly directed to means for holding the panes of glass of windows, show cases and the like, and in constructing my improvements I had in mind first of all a perfect joint and a secure one but also I desire to overcome the expense which is involved in beveling the glass and other expense incident thereto which is common in structures such as ordinarily employed.

A further object is to provide an improved construction of clip with improved means coupled thereto for supporting a shelf in the angle of a window or show case, and also to provide various novel features of construction and combination of correlating parts which result in a finished product superior in many ways to that heretofore known.

With these and other objects in view, the invention consists in certain novel features of construction and combinations and arrangements of parts which will be more fully hereinafter described and pointed out in the claims.

In the accompanying drawings—

Figure 1 is a perspective view illustrating the angle of a show window showing my improved securing means in operative position;

Figure 2 is an enlarged view in transverse section on the line 2—2 of Figure 1;

Figure 3 is a similar view in section on the line 3—3 of Figure 1;

Figure 4 is a view in longitudinal section on the line 4—4 of Figure 3;

Figure 5 is a view in elevation partly broken away to illustrate the parts beneath;

Figure 6 is a top plan view of my improved clip with the members properly assembled;

Figure 7 illustrates the two members of the clip in perspective;

Figure 8 is a perspective view of the inner clamping plate;

Figure 9 is a perspective view showing two panes of glass at an angle to each other properly recessed to receive my improved clip;

Figure 10 is a view showing my improved clip bent to support panes of glass at an angle greater than a right angle;

Figure 11 is a view similar to Figure 10 showing the position of the clips supporting panes of glass at a right angle but illustrating a modified form of finish;

Figure 12 is a sectional plan view showing how my improved clip can be employed in connection with other means for supporting a shelf;

Figure 13 is a view in section on the line 13—13 of Figure 12;

Figure 14 is a view in section on the line 14—14 of Figure 12.

1, 1 represent panes of glass which may, of course, be of any desired thickness and size in accordance with the window or show case or other construction with which they are to be employed. However, plate glass for this use is of standard thicknesses and it is to be understood that my improved clip is capable of sufficient adjustment to accommodate itself to any desired thickness of glass.

In order to accommodate my improved clip I provide recesses 2 in the adjacent edges of the panes of glass. This can be easily and cheaply done either at the top or elsewhere as may be preferred.

My invention resides more particularly in the construction of the clip itself, which is illustrated in detail in Figures 6 and 7. The clip comprises two members 3 and 4. It will be noted that these members are precisely alike in construction and may be molded or stamped from the same die.

Each clip member is usually right-angled although this angle may be changed by simply bending the clip or forming it, if so desired, in any other way in accordance with the angle of the window.

The clip members 3 and 4 have keyhole-shaped recesses 5 in one arm of the angle adjacent the bend. These recesses 5 at their narrower portions are adapted to receive the other member and the recesses are sufficiently wider than the thickness of the metal to allow the necessary movement for adjustment or positioning to insure effectual clamping. The inner ends of the keyhole-shaped recesses 5 constitute openings 6 for the reception of a clamping screw 7, as will more fully hereinafter appear.

In assembling the structure, the clip members are properly coupled as indicated in Figure 6 so that a pair of clamping jaws 8 is disposed at an angle to each other and located in the recesses 2 of the panes of glass, as clearly indicated in Figures 2 and 3 of the drawings.

The screws 7 above referred to have heads 9 at their outer ends which are normally enclosed in finishing pieces or beads 10. These finishing pieces or beads 10 may be of any cross sectional shape in accordance with the finished design.

I have illustrated in Figures 1 and 2 such finishing pieces as of triangular form and of sheet metal and having a longitudinal slot or opening at their inner edge to receive the screws and also the heads of the screws. These screw heads 9 are preferably flat so that while they may properly enter the beads or finishing pieces 10 they are prevented from turning when in place.

In connection with each clip I employ a plate 11 which constitutes a strip of metal bent so as to bring the end portions of said plate against the inner portions of the clip members, and I provide in this plate an opening 12 to receive the screw 7, and on the screw 7 I locate an adjusting nut 13. When this nut 13 is screwed home it will securely clamp the panes of glass between the clip members and also hold the bead or finishing member tightly in the angle as indicated.

To further insure a tight joint cement may be used in the angle preferably from the inside, as is of course to be understood.

By providing a clip such as above explained the members may be bent at an angle other than a right angle, as indicated in Figure 10, or the clip members may be exactly reversed so as to allow the plate or strip member 11 to be located at the outside of the window with the nuts 13 thereagainst and the finishing bead 10 at the inner portion of the angle. I, therefore, do not wish to be limited to the particular shapes nor the particular arrangement of angles as it is obvious that this device is capable of a wide range of variation, but I do claim broadly my improved construction and arrangement of clip with its co-operating parts capable of the functions stated.

When it is desired to employ a shelf 14 in the angle of the window where my improved clips are employed this can be conveniently and securely accomplished. In carrying out this purpose I provide a channel bracket 15 with an opening 16 therein to receive the screw 7 and securely clamp it to the plate 11 by the nut 13. The ends of this bracket 15 have alined openings 17 to receive a screw 18, the latter preferably projected through a supporting sleeve 19 between the members of the bracket 15. This screw 18 also projects through a supporting arm 20 through an opening 21 in the shelf 14.

The head 22 of the screw 18 is preferably located above the shelf and a nut 23 on the lower end of the screw clamps the parts although it is of course to be understood that I may exactly reverse the screw and may employ a washer 24 between the head of the screw and the plate as may be preferred.

The supporting arm 20 preferably is of channel form with inwardly projecting flanges 25 at its lower edge functioning as supports for hooks or hangers 26. I may employ various forms of hooks or hangers but have illustrated a double form of hook having a head or enlargement 27 at its upper end which is accommodated in the channel-shaped arm 20 and supported on flanges 25. This hook may be adjusted longitudinally and any number may be employed and easily removed and replaced as desired.

To brace and support the shelf 14 I provide a laterally projecting bar 28 which projects through a slot or recess 29 in the channel bar 20 and at its ends is formed with upwardly projecting lugs 30 on which the shelf rests. The free end or extremity of the arm 20 may constitute a tongue 31 having a set screw 32 therein to engage the shelf 14 to permit of a certain amount of adjustment to the shelf as occasion might require.

Various slight changes and alterations might be made in the general form of the parts described without departing from my invention, and hence I do not limit myself to the precise details set forth but consider myself at liberty to make such slight changes and alterations as fairly fall within the spirit and scope of the appended claims.

I claim:

1. A clip of the character described, comprising two angular crossed members forming two pairs of clamping jaws at an angle to each other and adapted to receive panes of glass between the pairs of jaws, clamping screws projected through the jaws at the angle thereof, a clamping plate located against the inner pair of jaws and receiving a screw, a head on one end of the screw and a nut on the other end of the screw.

2. A clip of the character described, comprising two angular crossed members forming two pairs of clamping jaws at an angle to each other and adapted to receive panes of glass between the pairs of jaws, clamping screws projected through the jaws at the angle thereof, a clamping plate located against the inner pair of jaws and receiving a screw, a head on one end of the screw and a nut on the other end of the screw, the heads of said screws located in the angle formed by the pairs of jaws, and a hollow bead or finishing piece located in the angle between the jaws and the angle between the panes of glass and enclosing the heads of the screws.

3. The combination with two panes of glass at an angle to each other, having recesses at their adjacent edges, a pair of angular crossed clip members located in said recesses and providing clamping jaws at both sides of both panes of glass, means for clamping the jaws against the glass, and a finishing piece located in the angle between the panes of glass and the angle of the clip members.

4. The combination with a window holding clip, comprising two angular crossed members, a screw constituting the clamping means to draw said members toward each other to clamp panes of glass, a bracket secured on the screw, an arm pivotally connected to the bracket, and a shelf carried by the arm and secured to the bracket.

5. In combination with a window holding clip, comprising two angular crossed members, a screw constituting the clamping means to draw said members toward each other to clamp panes of glass, a bracket secured on the screw, an arm pivotally connected to the bracket, a shelf carried by the arm and secured to the bracket, and a plurality of hangers movably and adjustably mounted on the arm.

6. In combination with a window holding clip, comprising two angular crossed members, a screw constituting the clamping means to draw said members toward each other to clamp panes of glass, a bracket secured on the screw, an arm pivotally connected to the bracket, a shelf carried by the arm and secured to the bracket, said arm of general channel form having inwardly projecting flanges at its lower edge, removable hangers supported on the flanges, a crossbar supported on the arm and supporting the shelf, and an adjusting screw in the arm engaging the shelf.

LEWIS H. BROOME.